United States Patent
Holter et al.

(10) Patent No.: US 6,305,728 B1
(45) Date of Patent: *Oct. 23, 2001

(54) DEVICE FOR MECHANICALLY GRASPING AND PALLETIZING RECTANGULAR OBJECTS

(75) Inventors: Carl F. Holter; John M. Manion, both of Waukesha, WI (US)

(73) Assignee: ABB Flexible Automation Inc., New Berlin, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/513,263

(22) Filed: Feb. 24, 2000

Related U.S. Application Data (62) Division of application No. 09/173,010, filed on Oct. 15, 1998, now Pat. No. 6,082,080.

(51) Int. Cl.[7] .............................. B25J 15/10; B65B 35/50
(52) U.S. Cl. ........................ 294/3; 294/81.2; 294/81.52; 294/67.32; 414/789.5; 901/39; 53/157; 53/540
(58) Field of Search .................................. 294/81.2, 81.52, 294/81.53, 67.32, 65, 2, 3; 414/589, 590, 665, 669, 672, 789.5; 53/157, 247, 537, 540; 901/31, 39, 40

(56) References Cited

U.S. PATENT DOCUMENTS

| | | | |
|---|---|---|---|
| 795,514 | * | 7/1905 | Jewitt . |
| 1,564,655 | * | 12/1925 | Westbo . |
| 1,730,128 | * | 10/1929 | Drake . |
| 1,765,023 | * | 6/1930 | McWane . |
| 1,767,525 | * | 6/1930 | Hoffman . |
| 1,833,545 | * | 11/1931 | Wehr . |
| 2,143,779 | * | 1/1939 | Kaufman . |
| 2,918,852 | * | 12/1959 | Buccicone . |
| 3,289,860 | * | 12/1966 | Dean . |
| 3,411,641 | * | 11/1968 | Dean . |
| 3,424,488 | * | 1/1969 | Renfroe . |
| 3,558,178 | * | 1/1971 | Taylor . |
| 3,559,371 | * | 2/1971 | Borrowman . |
| 3,606,056 | * | 9/1971 | Morgan . |
| 3,655,232 | * | 4/1972 | Martelee . |
| 3,670,912 | * | 6/1972 | Dunbar . |
| 3,709,543 | * | 1/1973 | Tax et al. .............................. 294/81.2 |
| 3,841,688 | * | 10/1974 | Karlsson ............................ 294/81.52 |
| 3,905,632 | * | 9/1975 | Caylor et al. . |
| 4,252,358 | * | 2/1981 | Klebs . |
| 4,648,237 | * | 3/1987 | Total . |
| 4,749,327 | * | 6/1988 | Roda . |
| 4,787,810 | * | 11/1988 | Cawley et al. . |
| 4,975,018 | * | 12/1990 | Langenbacher et al. . |
| 5,028,203 | * | 7/1991 | Masini . |
| 5,069,019 | * | 12/1991 | Lodewegen . |
| 5,169,271 | * | 12/1992 | Yamashita . |
| 5,199,845 | * | 4/1993 | Hirashima et al. . |
| 5,310,304 | * | 5/1994 | Baumgartner . |
| 5,419,095 | * | 5/1995 | Yohe . |
| 5,975,837 | * | 11/1999 | Focke et al. . |
| 6,082,080 | * | 7/2000 | Holter et al. ........................ 294/81.52 |

FOREIGN PATENT DOCUMENTS

| | | | |
|---|---|---|---|
| 2410769 | * | 7/1974 | (DE) . |
| 279070 | * | 8/1988 | (GB) . |
| 6507266 | * | 6/1965 | (NL) . |
| 1533980 | * | 1/1990 | (RU) . |

* cited by examiner

Primary Examiner—Dean J. Kramer
(74) Attorney, Agent, or Firm—Ryan Kromholz & Manion, S.C.

(57) ABSTRACT

A device for mechanically picking and palletizing rectangular objects of various sizes for attachment to a robotic arm. The device includes a pair of rails having a plurality of longitudinally spaced, elongated L-shaped grips extending there through. The distance between the respective rails can be adjusted to accommodate various width containers. The L-shaped grips are capable of pivotal rotation such that their grip ends rotate under the object for picking and palletizing. A pair of pallet hooks having suction cups attached thereto is also provided on the device.

15 Claims, 8 Drawing Sheets

DEVICE FOR MECHANICALLY GRASPING AND PALLETIZING RECTANGULAR OBJECTS

This is a divisional of application(s) Ser. No. 09/173,010 filed on Oct. 15, 1998 now U.S. Pat. No. 6,082,080.

BACKGROUND OF THE INVENTION

The present invention relates generally to the field of grasping, transporting and palletizing objects such containers for packaged goods and specifically to a device that is capable of loading and palletizing empty, partially filled or completely filled open-topped or unsealed containers. Open-topped or unsealed containers, and especially those that are empty or partially filled, are difficult to pick up, hold and transport, due to their relatively thin flexible walls and lack of structural integrity.

At the end of a conveyor line, manufactured products often arrive packaged in containers. While the container serves the primary purpose of protecting the product during shipping, the container may also serve the function of identifying the product. On more elaborately printed containers, there may appear indicia advertising the product, its benefits or its application. This latter type of packaging design is commonly found on products sold at the retail store level. Therefore the container must be aesthetically attractive and visually appealing. Accordingly, it is of utmost importance that each container, and especially its product indicia, not be damaged during removal from the assembly line and palletizing for shipment.

In most instances the task of removing the container from the conveyor line and palletizing the containers for shipping has been carried out manually. While having some advantages, such as insuring that the container is not damaged, manually handling containers is relatively a strenuous and tedious task. The continued lifting and moving of multiple containers can cause workers to strain and injure their backs. Further, depending upon the output speed and configuration of the conveyor line, many workers may be required to remove and properly palletize the containers. In an effort to reduce workforce size and injury costs, there has been a significant move toward automating this process by utilizing robots. As is known in the art, industrial robots may be fitted with various grasping devices, known as "end-effectors", for picking up and moving objects, including containers.

Most product containers are rectangular in shape and include four side walls, a bottom wall, and a top wall. Provided that the container has been properly sealed, the container is likely to have sufficient structural integrity allowing it to be grasped in a number of manners from the assembly line by a robotic end-effector and transported to a pallet. For example, the container may be removed from the assembly line by one or more suction cups that temporarily adhere to the top wall of the container. Alternatively, a pair of arms may apply a small amount of pressure to opposing side walls of the container such that the container may be lifted and transported.

However, if the container to be transported from the assembly line to the pallet lacks a top wall or if the container is not sealed, its structural integrity is greatly diminished. Suction cups cannot be attached to a container lacking a top wall. If a pair of arms were employed to apply a sufficient amount of pressure against opposing side walls of an open-topped or unsealed container, the container would most likely collapse or crush before the exerted force was great enough to lift and transport the container.

Another factor that controls the choice of device employed for palletizing containers is the consistency of container size. If each container coming off the conveyor line has the same physical size, the robotic end-effector can be designed specifically for that specific container size. However, if the container size varies, the end-effector must be capable of adjusting its grasping mechanism to accommodate the various container sizes.

A third factor that often dictates the means of removing containers from conveyor lines and transporting them to pallets is the amount of space available at the end of the conveyor line for this operation. Often times there is very little space allocated at the end of the conveyor line for palletizing containers. If a robotic end-effector is to be utilized, it must be sufficiently compact to allow for installation and operation within the allotted space available for such a device.

Accordingly, there is a need for a device that may be used for the removal and transportation of open-topped or unsealed containers. There is also a need for a device capable of easily grasping and palletizing containers of various sizes on the same pallet. More specifically, there is a need for a device that is compact enough to be positionable and operationable at the end of an conveyor line and that can pick up open-topped or unsealed containers of various sizes and transport those containers to pallets. Furthermore, the device must be able to properly palletize the containers to insure stability of the pallet during shipment.

SUMMARY OF THE INVENTION

According to the present invention, the foregoing and other objects and advantages are attained by providing an apparatus which may be used in a confined environment to pickup and transport open-topped or unsealed containers of various sizes from a pick up position such as the packaging end of a conveyor line. The containers can then be palletized on a pallet or placed into a case. The apparatus may also be used to pick open-topped or unsealed containers from a pallet and transport each container onto another pallet, into a case or onto a conveyor line.

A further object of the present invention is to provide an end-effector for an industrial robot, the end-effector being capable of picking up a container from a pick up position and transporting the container to a pallet for shipping or a case for packaging and shipping. The end-effector is also capable of picking up a container from a pallet and transporting the container to an other location, such as a case or conveyor-line.

In accordance with another aspect of the invention, the device can be utilized in a relatively confined area as it requires a minimum amount of space around the periphery of the container for grasping and palletizing the container.

A further advantage of the invention is to provide an end-effector for use with a robot that is easily adjustable to grasp containers of various sizes.

A further advantage of the invention is to provide a robotic end-effector that is capable of grasping more than one container from a pick up position and palletizing each respective container in a separate location.

These and other objects and advantages are achieved in an end-effector including a support frame suspended from a centrally located stanchion, which in turn, may depend from the distal end of a 4- or 6-position robot arm. The support frame includes a pair of linear bearings supporting a pair of parallel rails arranged for relative lateral movement on said bearings to accommodate various width containers. A plurality of longitudinally spaced, elongated L-shaped fingers extend through longitudinally spaced apertures in the respective rails, and are arranged for pivotal rotation to a desired position by means of a gear secured to the top end portion of each finger extending through the respective apertures. Each gear preferably abuts an adjacent gear and is in gear meshing contact therewith for simultaneous rotative movement of the respective fingers.

The carton-supporting arms of the series of adjacent L-shaped fingers normally face one another and lie in the same plane. The fingers are moved inwardly for lateral pickup and support of a container resting thereon. The arms face one another to permit simultaneous rotation inwardly and outwardly, since the abutting gears will be rotated in opposite directions. The gears may be of conventional toothed configuration. Pre-selected gears may have portions cutaway to provide a means of zoning of selected groups of fingers.

Pallet hooks are provided on the rails for pickup of supporting pallets from a pallet supply and delivery of pallets to the palletizing area near the pick up position. Vacuum cups are provided at one end of the rails for pickup and delivery of flat sheets to be placed on a supporting pallet or between container layers. Robotic controls also permit the entire frame to be rotated for placement of alternate rows of stacked containers for greater stacking stability of the containers.

In a preferred embodiment, the invention may be described as an apparatus for grasping, transporting and palletizing a container having opposed side walls and opposed bottom edges, the apparatus having a pair of parallel rails spaced at a predetermined distance from one another and laterally movable with respect to one another; a rotatable link positioned between said parallel rails; first and second tie rods, each said tie rod pivotally secured to one rail and to the rotatable link; a plurality of longitudinally spaced apertures being formed along each rail; a plurality of L-shaped fingers, each finger being received in an aperture; and each finger being rotatably movable and coupled to at least one adjacent rotating finger along each rail.

In another preferred embodiment, the present invention is a robotic end-effector for an industrial robot, said robotic end-effector having a frame capable of being coupled to the robot, the frame including at least one linear bearing attached thereto; a pair of rails arranged for respective lateral movement on said linear bearing; a plurality of longitudinally spaced apertures formed in each rail; a plurality of longitudinally spaced, elongated L-shaped rotating fingers extending through said apertures, each rotating finger having a top portion; and a gear being attached to each rotating finger top portion, said gears abutting one another for simultaneous rotative movement of the rotating fingers along each rail. In a highly preferred embodiment the end-effector includes a zoning mechanism for interrupting the transportation of a group of containers supported by the rotating fingers wherein at least one of said gears has an interrupted periphery, is in non-meshing contact with an adjacent gear or is removed.

In addition, the invention may be described as a system for gripping, transferring and palletizing containers lacking structural integrity from a pick up position, the system comprising a supply of pallets; an industrial robot with an end-effector, said end-effector having a pair of parallel rails arranged for lateral movement with respect to one another, means for providing lateral movement of said rails, a plurality of L-shaped rotating finger extending longitudinally from said rails, means for providing rotational motion of said rotating fingers, a pair of pallet hooks pivotally extendable from said rails, and means for providing pivotal motion of said pallet hooks; and a palletizing station adjacent said pick up position.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

The present invention comprises an improved end-effector apparatus 10 for grasping, transporting and palletizing open-topped or unsealed containers. In brief, the apparatus includes a stanchion 30, a supporting base plate 40, a pair of bearing rails 50, a pair of linear bearing assemblies 60, a linkage assembly 70 for maintaining a synchronized relationship of the bearing rails 50, a rail width adjusting mechanism 90, a plurality of L-shaped rotating fingers 100, a finger rotating mechanism 140 and a pair of pallet hooks 170.

Figure 1:
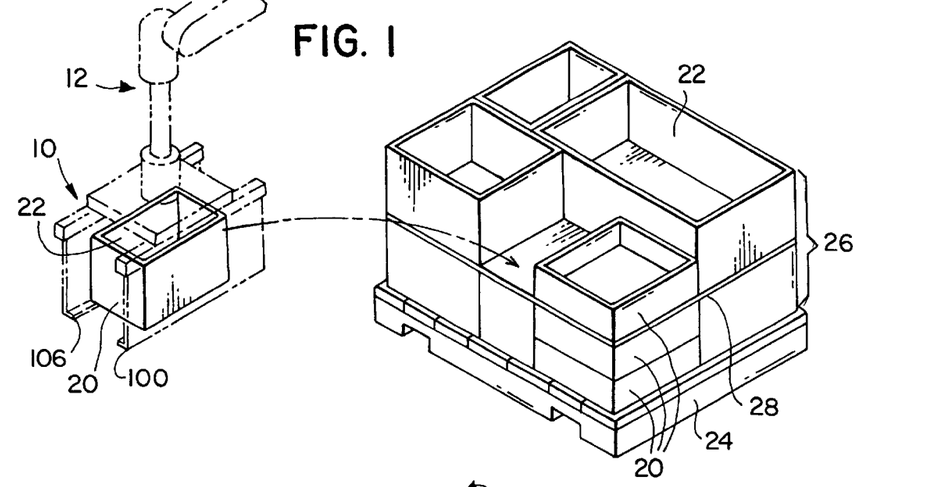
FIG. 1 is a perspective, environmental view depicting an industrial robot arm, the end-effector of the present invention transporting an open-topped container and a plurality of palletized open-topped containers.

With particular reference to FIG. 1, the environment of the present invention is shown with the end-effector apparatus 10 for grasping, transporting and palletizing containers 20 and the industrial robot 12 to which it is attached being shown in phantom. A container 20, having an open top 22, is shown grasped between the L-shaped rotating fingers 100 of the apparatus 10. Adjacent the robot 12 and the apparatus 10 is a pallet 24 containing a plurality of containers 20. The containers 20 are palletized in a predetermined order on the pallet 24. As can be seen in FIG. 1, the palletized containers 20 may be of different sizes. As will be discussed in detail below, the ability to grasp and stack containers of various sizes is a benefit of the present invention. To better stabilize the palletized load 26, and to prevent any damage to the containers 20, a sheet of cardboard 28 is routinely inserted between each layer of containers 20.

Figure 2:
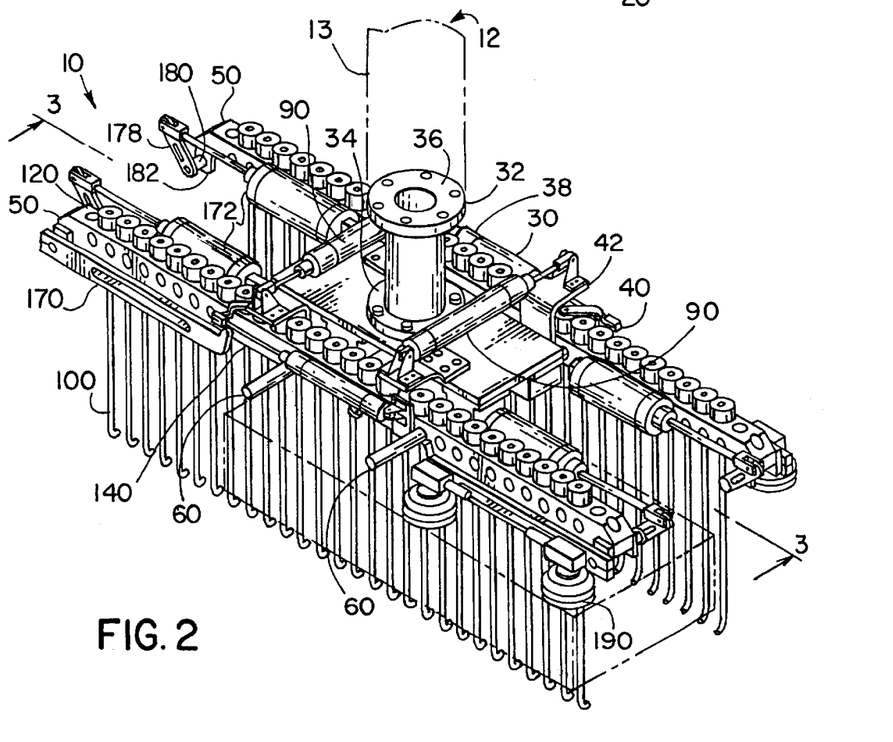
FIG. 2 is a perspective view of the present invention.

The present invention is shown in greater detail in the view of FIG. 2. A conventional 4- or 6-position robot arm 13 of the industrial robot 12 (shown in phantom) is connected to the stanchion 30 at its proximate end 32. The distal end 34 of the stanchion 30 is connected to the supporting base plate 40. While both the proximate and distal end connections are shown to be achieved by utilizing a flange 36 and tube 38, it is to be understood that any conventional way of connecting the industrial robot arm to the base plate 40 could be utilized.

Figure 6:
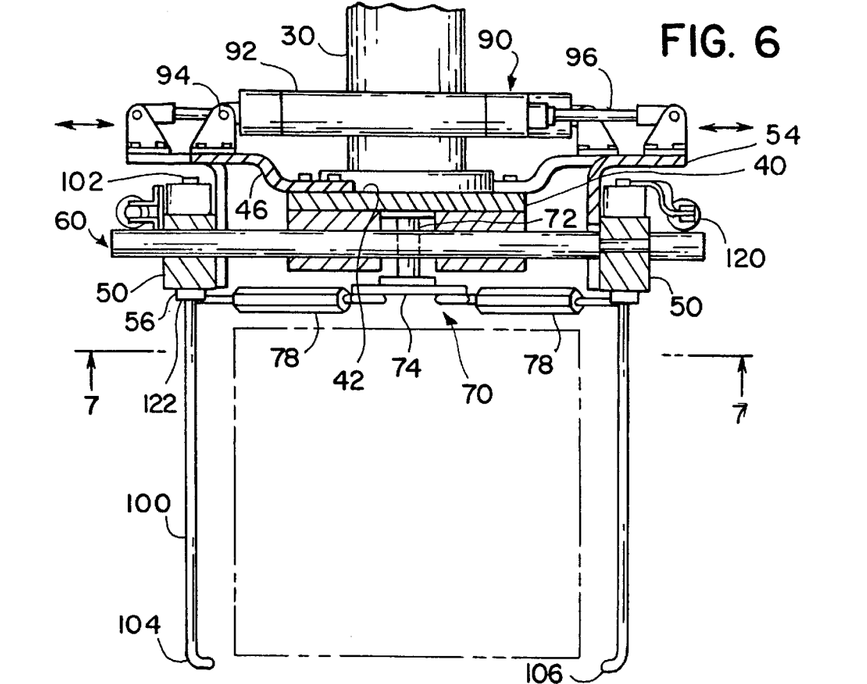
FIG. 6 is a cross-sectional end view of the present invention taken on line 6—6 of FIG. 3.
Figure 7:
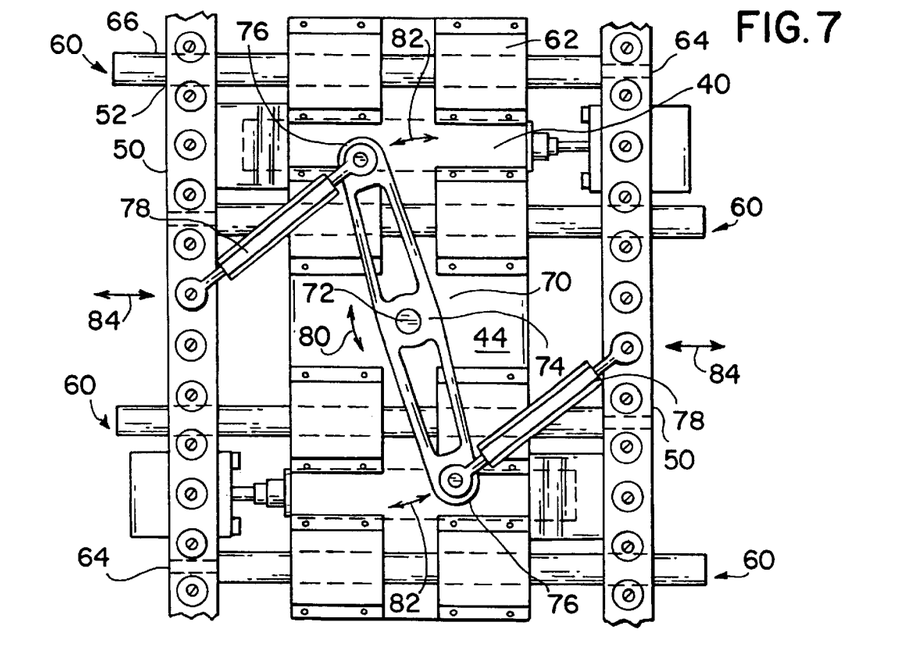
FIG. 7 is a cross-sectional bottom plan view of the present invention taken on line 7—7 of FIG. 6.

Supporting plate 40 has an upper surface 42 (see FIG. 6) and a lower surface 44 (see FIG. 7). Referring now to FIG. 7, mounted to the lower surface 44 of base plate 40 is a plurality of linear bearing assemblies 60. Linear bearings are known in the art. They typically include a bearing housing 62 and a bearing rail or shaft 66. The bearing housings 62 are mounted to the lower surface 44 of base plate 40. Ends 64 of bearing shafts 66 are each attached to one of the bearing rails 50. The bearing shafts 66 passes through bearing rod openings 52 formed in the pair of bearing rails 50. Four linear bearing assemblies 60 are utilized in the preferred embodiment. One pair has its fixed end 64 attached to the first bearing rail 50 and its bearing shaft 66 passes through apertures 52 formed in the opposite bearing rail 50. The second pair is arranged in the reverse order such that its fixed ends 64 are attached to the bearing rail 50 having openings or apertures 50 for receiving the first pair of linear bearings shafts 66. Accordingly, each bearing rail 50 slides in a linear fashion with respect to the base plate 40. The aforementioned arrangement of linear bearings 60 also provides a constant parallel relationship between the bearing rails 50.

Figures 3, 5:
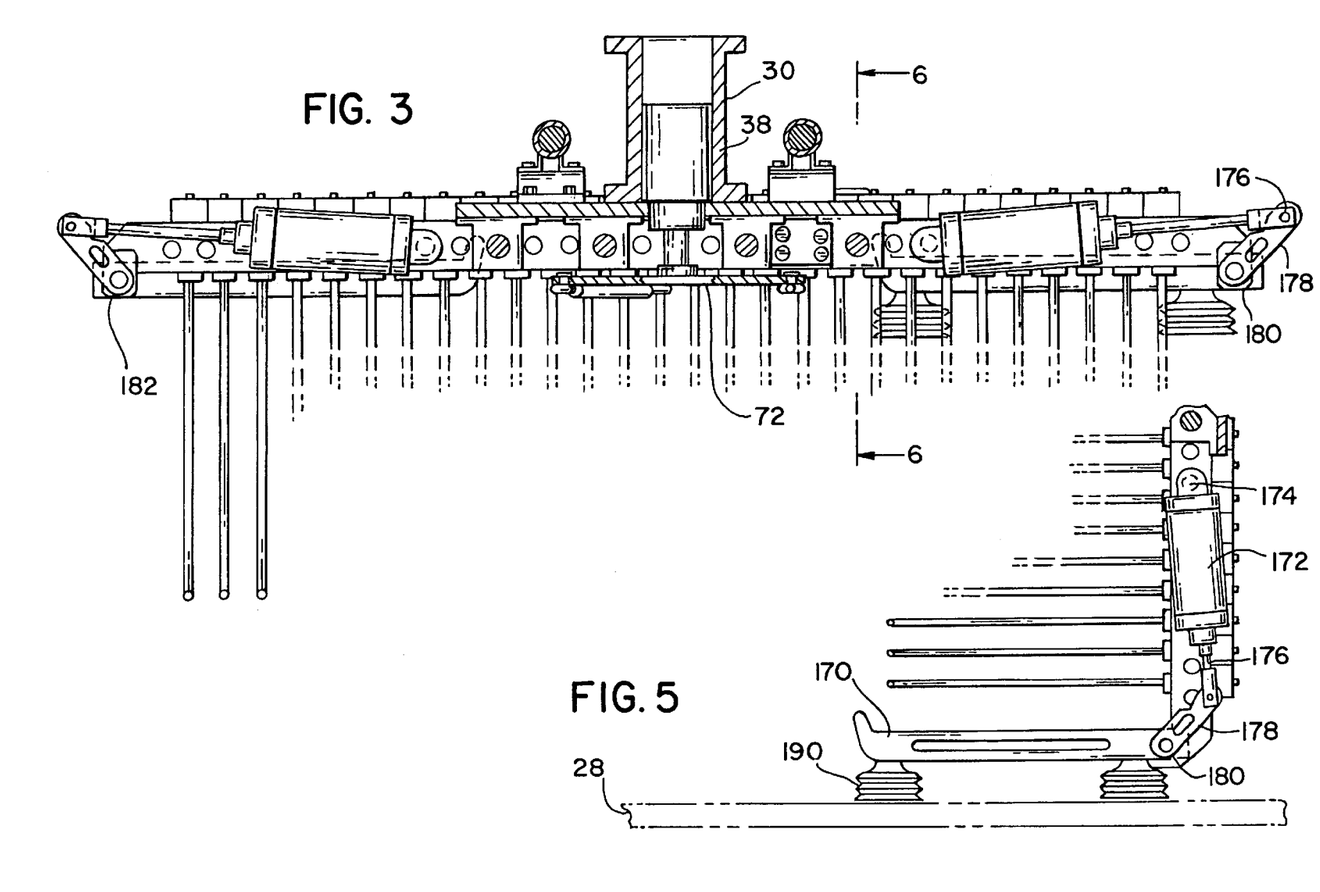
FIG. 3 is a cross-sectional plan view of the present invention taken on line 3—3 of FIG. 2.
FIG. 5 is a partial front plan view, of the present invention, rotated 90° with respect to the view of FIG. 5 showing the pallet hook extended and the suction cups gripping a cardboard sheet.

As best shown in FIGS. 3, 6, and 7, a linkage assembly 70 is provided to maintain an equal distance between the center of the supporting plate 40 and each bearing rail 50. The adjustment mechanism 70 comprises a shaft 72, a center link 74 and a pair of tie rods 78. The first end of shaft 72 is connected to base plate 40 and the opposite end is connected to the central portion of center link 74. Center link 74 has two link ends, 76. The pair of tie rods 78 couples each center link end 76 to one of the bearing rails 50. Referring to FIGS. 6 and 7, it is can be seen that one end of each tie rod 78 is pivotally connected to each bearing rail 50 and the other tie rod end is pivotally connected to each center link end 76. The length of each tie rod 78 can be adjusted in a know manner.

Now referring specifically to FIG. 7, as the linkage assembly 70 rotates about shaft 72, the parallel rails 50 are each translated an equal distance on linear bearing assemblies 60. The result is, provided the length of each link end 76 is equivalent and the length of each tie rod 78 is equivalent, bearing rails 50 equally, linearly, and parallely translate along linear bearing assemblies 60 as shown by arrows 84.

Referring specifically to FIG. 6, a bearing rail width adjustment mechanism 90 is also provided. The rail adjustment mechanism provides the gripping force of the end-effector apparatus 10. The mechanism 90 includes a pair of linear actuators 92 such as pneumatic cylinders or ball screws. Each actuator 92 has a fixed end 94 and a moving end 96. The fixed end 94 of each actuator 92 is attached to base plate 40 by means of a bracket 46. The fixed end of one actuator 92 is attached proximate to one corner of the base plate 40. The fixed end of the other actuator is attached to the diagonally opposed corner. Each actuator 92 extends across the upper surface 42 of base plate 40 where its moving end 96 is coupled to bracket 54. Each bracket 54 is attached to a respective bearing rail 50. When the moving end 96 of each actuator 92 is extended, the distance between each bearing rail 50 is increased. When the moving end 96 of each actuator 92 is retracted, the distance between each bearing rail 50 is decreased. The actuators 92 are connected to the same fluid supply means or rotary motion means (not shown). While the preferred embodiment utilizes two actuator assemblies, it should be noted that only one actuator assembly is required. The arrangement of linear bearing assemblies 60 and linkage assembly 70 provide for a constant parallel relationship between bearing rails 50 as they perform their gripping function.

Figure 14:
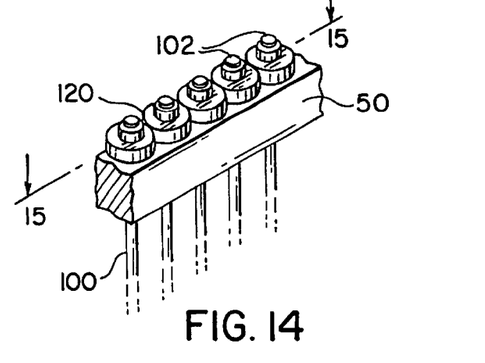
FIG. 14 is a partial perspective view of the rail, plurality of gears and rotating fingers.

With reference to FIGS. 6 and 7, a plurality of openings 56 are formed perpendicular to the apertures 52 formed in the bearing rails 50 for the linear bearing rods 66. Each opening 56 is capable of receiving a L-shaped rotating finger 100. As shown in FIG. 6, L-shaped rotating fingers 100 have top ends 102 and lower distal ends 104 angularly formed to provide container supports 106. A gear 120 (see FIGS. 9, 14 and 15) is affixed to the top end 102 of each rotating finger 100. The portion of the finger 100 just beneath the top end 102 passes through an opening 56 formed in bearing rails 50. Just beneath each bearing rail 50, a collar 122 is affixed to each finger 100. The top end of the finger 100 is thus rotationally supported within bearing rail 50. The length of each finger 100 is greater than the height of the tallest container the present invention 10 has been designated to grasp, transport and palletize. The distal end 104 of each rotating finger 100 is bent approximately ninety degrees to form a container support 106.

Figure 15:
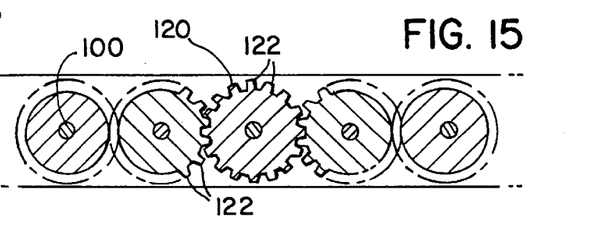
FIG. 15 is a top plan view taken on line 15—15 of FIG. 14.

Referring again to FIG. 2, it can be seen that a plurality of L-shaped rotating fingers 100 and gears 120 are uniformly arranged along the length of each bearing rail 50. A gear 120 is fixedly attached to the upper end 102 of each L-shaped rotating finger 100. As best shown in FIG. 15, the teeth 122 of each gear 120 mesh with the adjacent gear's teeth. The uniformly spaced gears 120 are in rotational contact along the length of each bearing rail 50. Accordingly, when one gear 120 is rotated about its aperture 56 in bearing rail 50, all of the other contacting gears rotate an equivalent amount.

Figure 8:
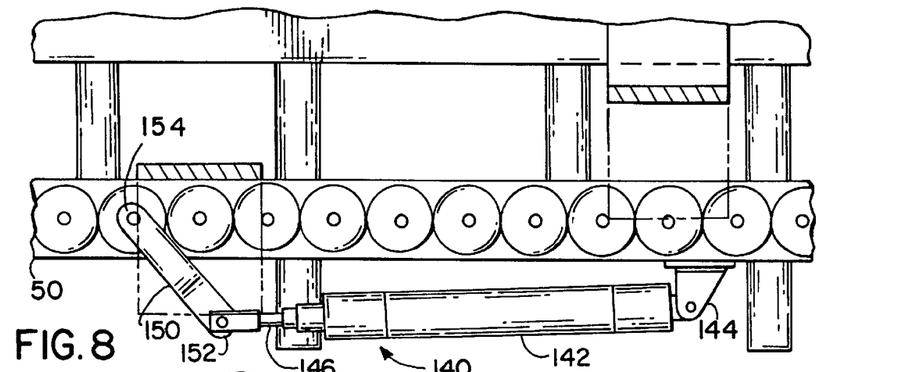
FIG. 8 is a partial top plan view of the rail, a plurality of gears and the gear rotating mechanism in its retracted position.
Figure 10:
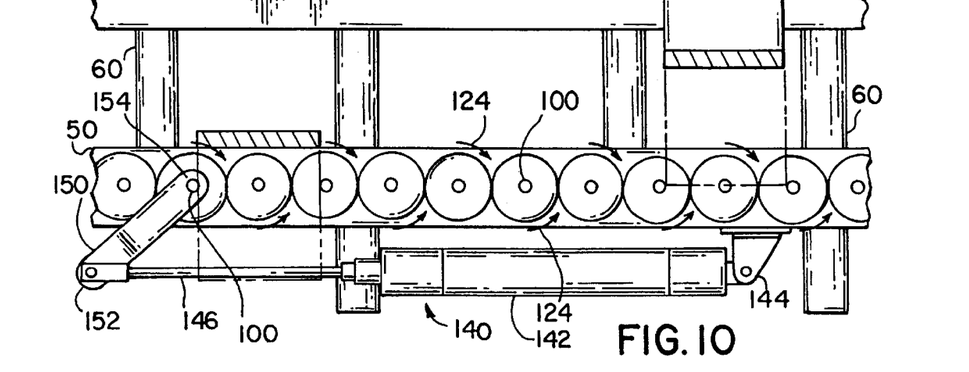
FIG. 10 is a partial top plan view of the rail, plurality of gears and the gear rotating mechanism in its engaged position.

The mechanism 140 for rotating the meshing gears 120 is shown in FIGS. 8 and 10. Another linear actuator 142, such as a pneumatic cylinder or ball screw, is attached at its fixed end 144 to each bearing rail 50. The moving end 146 of the actuator 142 is attached to a connecting link 150. End 152 of connecting link 150 is pivotally attached to the moving end 146 of actuator 142. The opposite connecting link end 154 is fixedly attached to a L-shaped rotating finger 100 at the finger top end 102.

Figure 9:
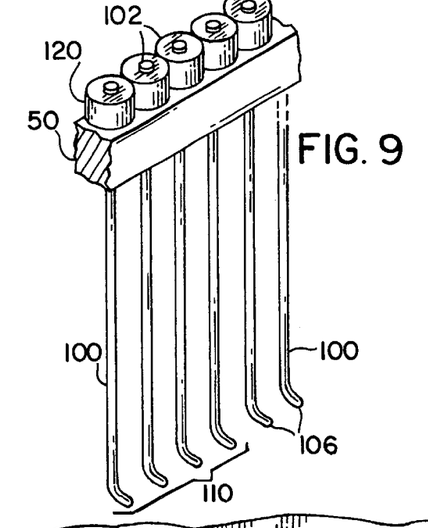
FIG. 9 is a partial perspective view of the L-shaped grips, the rail and the gears depicting the orientation of the gripping fingers in the engaged, supporting position.
Figure 11:
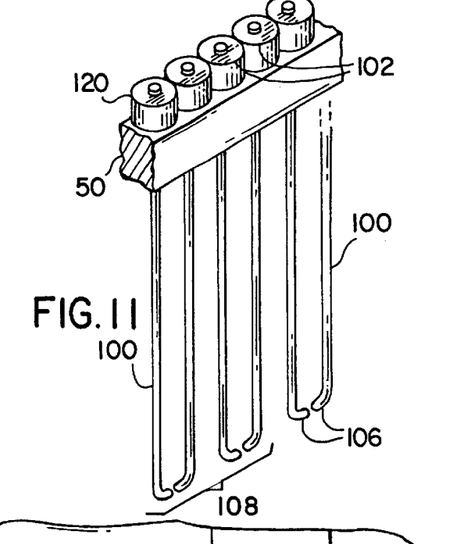
FIG. 11 is a partial perspective view of the L-shaped grips, the rail and the gears depicting the orientation of the gripping fingers in the retracted, non-engaging position.

When each actuator 142 is in its fully retracted position, as shown in FIG. 8, the container supports 106 of L-shaped rotating fingers 100 are oriented as shown in FIG. 11. It is important to note that supports 106 do not all face the same direction but instead are arranged in an alternating fashion 108. The reason for this is that when the rotating fingers 100 are actuated, they do not all rotate in the same direction. Instead, each finger rotates in an opposite direction as compared to its immediately adjacent fingers. Accordingly, the rotational forces of the containers supports 106 substantially cancel each other out and the rotating fingers 100 do not move the container forward or backward during their rotation. When each actuator moving end 146 extends, as shown in FIG. 10, the linear motion of the moving end 146 is translated into rotational motion of connecting link 150. The result is the rotation of the L-shaped fingers 100 to which connecting link 150 is fixedly attached. As stated above, each L-shaped finger 100, including the L-shaped finger to which connecting link 150 is attached, is coupled to a gear 120. As shown by arrows 124 in FIG. 10, the rotational motion is further imparted to each additional gear 120 that is in gear meshing contact. When the rotational motion is complete, the container supports 106 are oriented in their container supporting position 110 as shown in FIG. 9.

Figure 4:
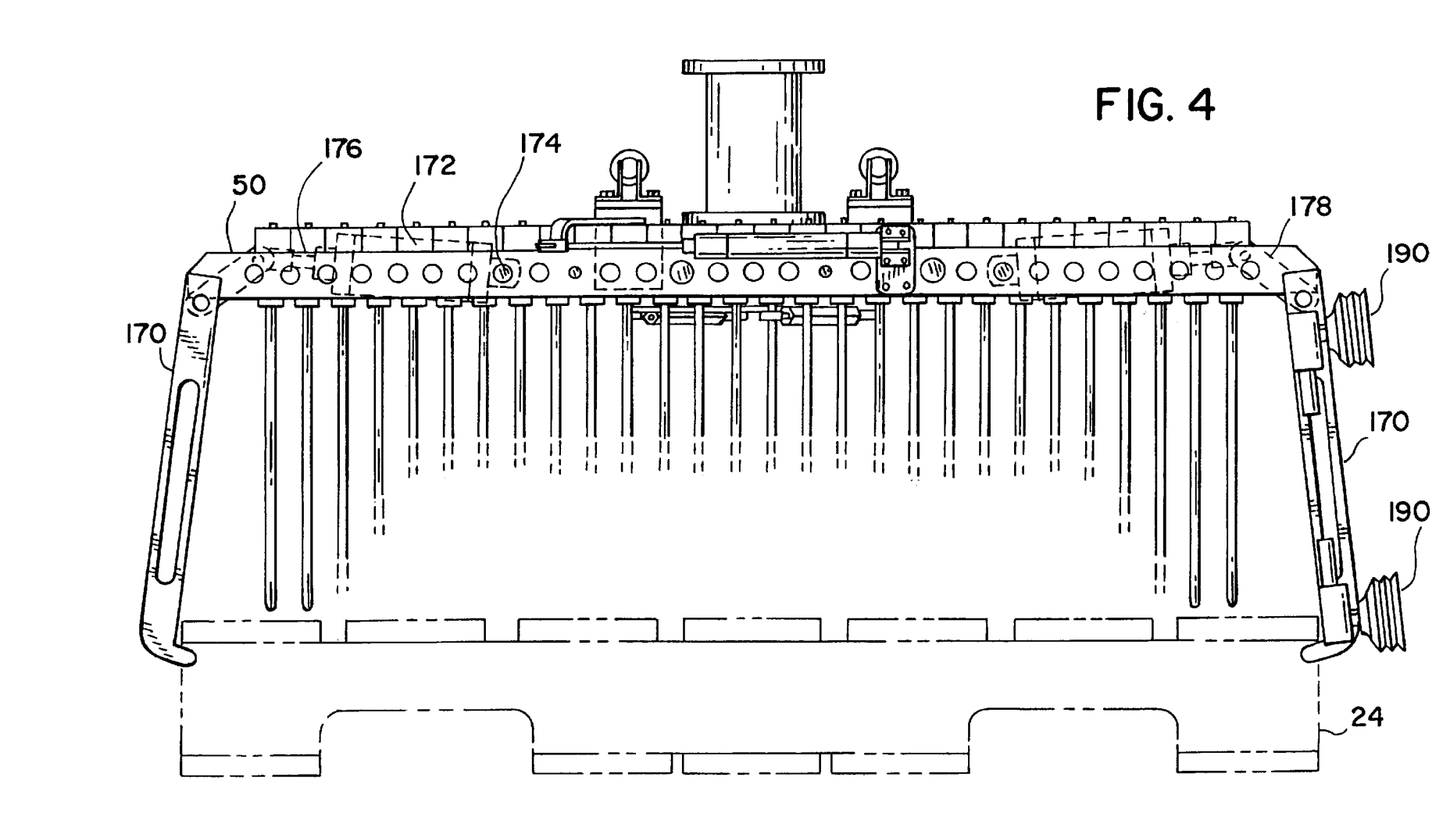
FIG. 4 is a front plan view of the present invention showing both pallet hooks extended and gripping a pallet.

The present invention is also provided with two pairs of pallet hooks 170 and two pairs of suction cups 190. The pallet hooks are best shown in FIGS. 2 and 4. Each pair of hooks 170 is pivotally attached to one bearing rail 50. The hooks are movable from a retracted position (shown in FIG. 2) to an extended position (shown in FIG. 4). Each hook 170 is pivoted by the mechanical combination of another linear actuator 172 and a connecting link 178. The fixed end 174 of each actuator 172 is attached to the inside of the bearing rail 50. The moving end 176 of each actuator 172 is pivotally attached to the first end of each connecting link 178. The second end of each connecting link 178 is fixedly attached to each pallet hook shaft 180. Each shaft 180 is rotatably supported by a bracket 182 attached to the underside of each bearing rail 50. When each actuator 172 is in its fully extended position, as shown in FIG. 2, each pallet hook 170 is retracted and positioned adjacent to each bearing rail 50. When the actuator moving end 174 is retracted, each pallet hook 170 pivots into its pallet gripping position as shown in FIG. 4. While the preferred embodiment of the present invention 10 includes four pallet hooks 170, it is to be understood that a fewer number could be utilized to pick up and properly position a pallet 24.

A pair of suction cups 190 is attached to one pair of pallet hooks 170 as shown in FIG. 2. The function of the suction cups 190 is to pick up and place a sheet of cardboard 28 between each layer of containers 20 in a palletized load 26. This is accomplished when the pair of pallet hooks 170 is in its extended position as shown in FIG. 5.

The present invention is utilized in the following manner. The pallet hooks 170 are extended over a stack of pallets 24 located in the vicinity of the industrial robot 12. A single pallet is engaged by the pallet hooks (as shown in FIG. 4) and transported to the palletizing location. The pair of pallet hooks 170 including suction cups 190 are extended over a stack of cardboard 28 also located within the working area of the industrial robot 10. A vacuum is applied to the suction cups 190 and a single sheet of cardboard 28 is removed from the stack. The sheet of cardboard 28 is placed on the pallet 24. The industrial robot arm 12 next moves to the pick up position to pick up a container 20. The present invention is positioned by the robot 12 directly over the container 20 at the pick up position and is next lowered so that its L-shaped rotating fingers 100 pass downward along opposite sides of the container 20. When the container supports 106 have just cleared the lower edge of the container 20, actuators 142 are actuated to rotate the L-shaped fingers 100 into their gripping position (as shown in FIG. 9). At substantially the same time, actuators 92 are retracted until the L-shaped fingers contact and place a minimal amount of pressure on opposite sides of the container 20.

The container 20 is next lifted from the pick up position and transported to the pallet 24 where the industrial robot 12 places containers 20 in their proper position upon the pallet 24. One of the many advantages of the present invention 10 is that it requires a minimal amount of clearance on the opposite gripping sides of the container 20. Accordingly, the container 20 can be placed into a tight opening as shown in FIG. 1. The present invention 10 may also be use to place and remove containers from cases or other enclosures where there exists a minimal amount of clearance for the end-effector apparatus.

When one or more layers of containers 20 have been stacked, a new sheet of cardboard 28 is retrieved and placed over the containers 20. When the pallet 24 has been filled with the proper number of containers 20, the palletized load 26 is removed with a forklift truck (or other suitable means) and the pallet hooks 170 are utilized to retrieve the next empty pallet 24.

Figure 12:
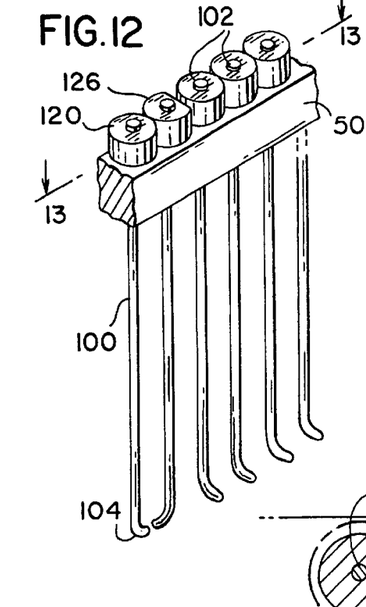
FIG. 12 is a partial perspective view of the rail, plurality of gears and rotating fingers where a portion has been removed from one gear.
Figure 13:
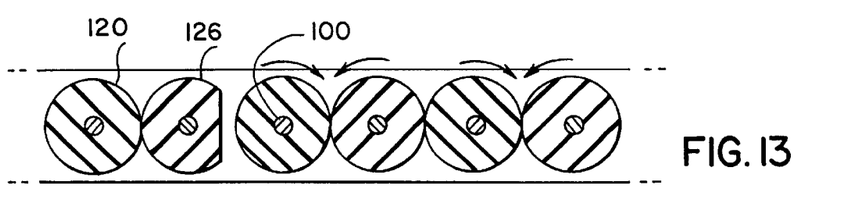
FIG. 13 is a top plan view taken on line 13—13 of FIG. 12.
Figure 18:
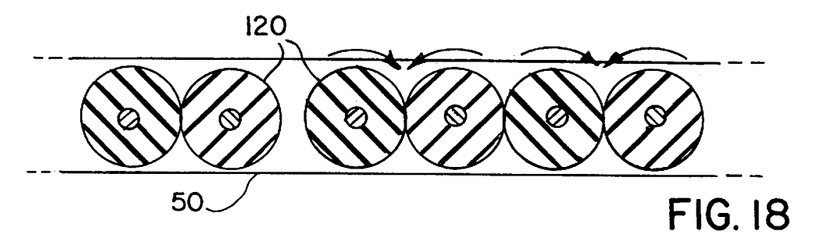
FIG. 18 is a top plan view of an alternate method of zoning.
Figure 19:
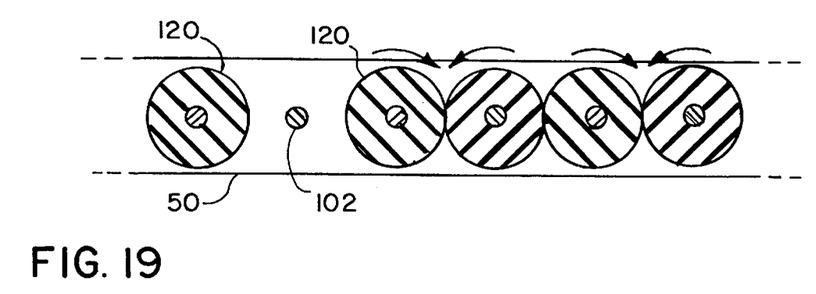
FIG. 19 is a top plan view of another alternate method of zoning.

The end-effector 10 may be provided with a zoning mechanism for interrupting the transportation of a group of containers 20 supported by the rotating fingers 100. Now referring to FIGS. 12 and 13, it can be seen that the rotational motion of the gears 120 can be interrupted by replacing a gear 120 with a gear 126 having a portion of its periphery removed or interrupted. In FIGS. 12 and 13, the removed section is an arcuate sectional portion. Zoning may also be achieved by positioning one gear 120 in non-meshing contact with another gear 120 (FIG. 18). Alternatively, zoning may be achieved by removing a gear 120 or only attaching gears 120 to selected rotating finger top portions 102. (FIG. 19). In both instances, a space is created between adjacent gears 120. The space is of sufficient size to prevent the gears 120 from meshing and thus imparting rotational motion to one another.

Furthermore, additional gear rotating mechanisms 140 can be added to each bearing rail 50 to create rotating finger zones. Two or more zones may be created allowing the present invention 10 to grasp two or more containers 20 simultaneously, transport those containers 20 to the pallet 24, release the first container on the pallet, reposition itself, and release the second container on the pallet. Depending upon container size, any number of gripping and palletizing zones could be created.

In addition to gears 120, other mechanical elements may be utilized in the present invention for rotating fingers 100. For example, gears 120 may be replaced with rollers having a high fiction surface on their outer cylindrical periphery. The high friction surface insures that the rollers rotate in unison and that the fingers 100 maintain a consistent alignment. A number of links could also be utilized in place of the gears 120 for rotating each finger between its open and gripping position.

Figure 16:
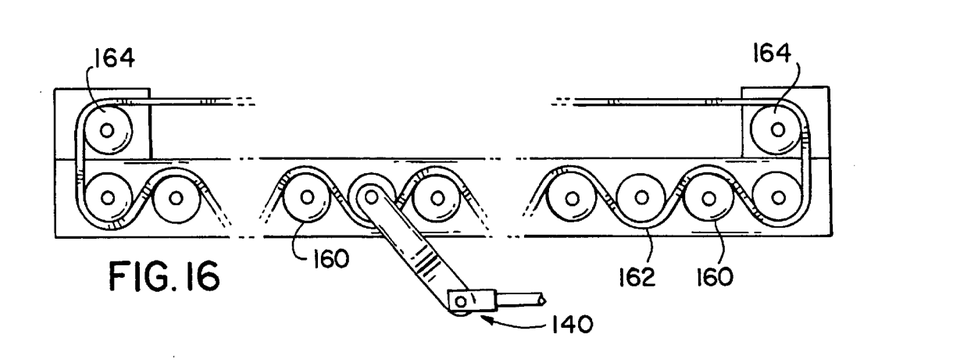
FIG. 16 is top plan view of an alternate embodiment for engaging and disengaging the L-shaped rotating fingers.

FIG. 16 depicts another way of achieving the alternating finger rotation of fingers 100 discussed above. The gears or rollers attached to the top end of each finger are replaced with cogs 160 and a belt 162. The belt is threaded in a serpentine fashion around each cog thus producing the required rotational motion discussed above. A pair of return cogs 164 is provided to complete the belt loop. As discussed above, a similar rotating mechanism is utilized to actuate or rotate the fingers 100.

Figure 17:
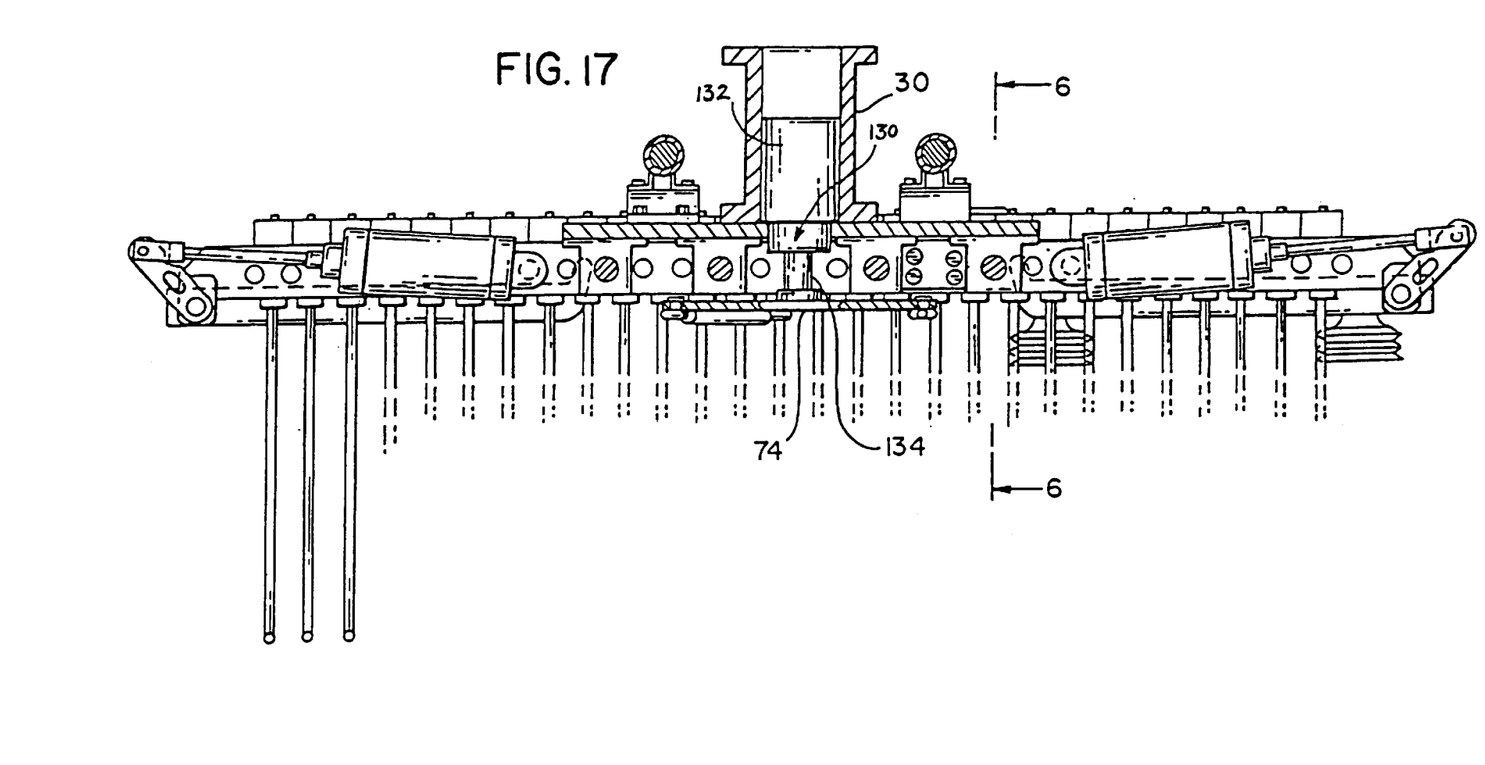
FIG. 17 is a cross-sectional plan view of an alternate embodiment of the present invention taken on line 3—3 of FIG. 2.

Now referring to FIG. 17, an alternative embodiment of the present invention is shown. Another bearing rail adjustment mechanism 130 is provided to adjust and maintain the distance between the two bearing rails 50. This adjustment mechanism 130 comprises a motor 132, an output shaft 134, a center link 74 and a pair of tie rods 78. The motor 132 is mounted to the upper surface 42 of the base plate 40 and housed within stanchion 30. Preferably, the motor 132 is a stepper motor or servo motor capable of exerting a predetermined rotational motion to its output shaft 134. A known control for the motor also provided (but not shown). The motor 132 must also be capable of being locked in the selected rotational position so that the bearing rails 50 do not move during the gripping operation. Output shaft 134 is connected to the central portion of center link 74. Center link 74 has two link ends, 76. The pair of tie rods 78 couples each center link end 76 to one of the bearing rails 50. Referring to FIGS. 6 and 7, it is can be seen that one end of each tie rod 78 is pivotally connected to each bearing rail 50 and the other tie rod end is pivotally connected to each center link end 76.

Now referring again to FIG. 7, when the motor 132 rotates output shaft 134 in either a clockwise or counter clockwise direction as shown by arrow 80, ends 76 of center link 74 moves in the same direction (as shown by arrows 82). The rotational motion is translated into linear motion by virtue of linear bearings 60 and the above described orientation. The final result is that bearing rails 50 are linearly translated along linear bearing assemblies 60 as shown by arrows 84. If the length of each link end 76 is equivalent and the length of each tie rod 78 is equivalent, bearing rails 50 will move the same distance relative to base plate 40.

This alternate embodiment may be utilized in the following manner. After the pallet and cardboard sheet have been properly positioned, the industrial robot arm 12 moves to the pick up position to pick up a container 20. While in motion toward the pick up position or prior to this time, motor 132 exerts a predetermined amount of rotational motion to center link 74 thereby adjusting the spacing between bearing rails 50 to a distance slightly greater than the width of the container 20 to be palletized. The L-shaped rotating finger supports 106 are oriented as shown in FIG. 11. The present invention is positioned by the robot 12 directly over the container 20 at the pick up position and is next lowered so that its L-shaped rotating fingers 100 pass downward along opposite sides of the container 20. When the rotating finger supports have just cleared the lower edge of the container 20, actuators 142 are actuated to rotate the L-shaped rotating fingers 100 into their gripping position (as shown in FIG. 9). At substantially the same time, actuators 92 are retracted until the L-shaped rotating fingers contact and place a minimal amount of pressure on opposite sides of the container 20. Alternatively, the motor 132 may be again energized thereby supplying an additional amount of rotational motion to center link 74 that in turn would apply the gripping force to the container 20.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

What is claimed is:

1. An apparatus for grasping, transporting and palletizing a container having opposed side walls and opposed bottom edges, the apparatus comprising:
    a pair of parallel rails spaced at a predetermined distance from one another and laterally movable with respect to one another;
    a rotatable link positioned between said parallel rails;
    first and second tie rods, each said tie rod pivotally secured to one rail and to the rotatable link;
    a plurality of longitudinally spaced apertures being formed along each rail;
    a plurality of L-shaped rotating fingers, each rotating finger being received in an aperture;
    each rotating finger being rotatably movable and coupled to at least one adjacent rotating finger along each rail; and
    a motor having an output shaft, said output shaft being coupled to said rotatable link.

2. The apparatus of claim 1, further comprising:
    a plurality of gears, each gear being attached to a rotating finger; said gears being in frictional contact for simultaneous rotative movement of the rotating fingers along each rail.

3. The apparatus of claim 1 further comprising:
    a plurality of gears, each gear being attached to a rotating finger; said gears being in contact for simultaneous rotative movement of the rotating fingers along each rail.

4. The apparatus of claim 1, further comprising:
    at least one rotating finger rotating mechanism having a fixed end and a moving end;
    a connecting link having a first end and a second end;
    the fixed end being attached to one rail;
    the moving end being pivotally attached to the first end of the connecting link;
    the second end of the connecting link being attached to one rotating finger.

5. The apparatus of claim 4, wherein said rotating finger rotating mechanism is a linear actuator.

6. The apparatus of claim 1, further comprising:
    at least one rail width adjusting mechanism having a fixed end and a working end;
    the fixed end being attached to one rail;
    the working end attached to the other rail.

7. A robotic end-effector for an industrial robot, said robotic end-effector comprising:
    a frame capable of being coupled to the robot, the frame including at least one linear bearing attached thereto;
    a pair of rails arranged for respective lateral movement on said linear bearing;
    a rotatable link positioned between said parallel rails;
    a plurality of longitudinally spaced apertures formed in each rail;
    a plurality of longitudinally spaced, elongated L-shaped rotating fingers extending through said apertures, each rotating finger having a top portion;

a gear being attached to each rotating finger top portion, said gears meshing with one another for simultaneous rotative movement of the rotating fingers along each rail; and a motor having an output shaft and including means for providing a predetermined, alternative, rotational motion to said output shaft, said output shaft being coupled to said rotatable link.

8. The robotic end-effector of claim 7 further comprising a zoning mechanism for interrupting the transportation of a group of containers supported by said rotating fingers, wherein said mechanism includes at least one of said gears having an interrupted periphery.

9. The zoning mechanism of claim 8, wherein said mechanism includes at least one of said gears being in non-meshing contact with at least one other gear.

10. The robotic end-effector of claim 7, further comprising:

at least one rotating finger rotating mechanism having a fixed end and a moving end;

a connecting link having a first end and a second end;

the fixed end being attached to one rail;

the moving end being pivotally attached to the first end of the connecting link;

the second end of the connecting link being attached to one rotating finger.

11. The robotic end-effector of claim 7, further comprising:

at least two rotating finger rotating mechanisms, each mechanism having a fixed end and a moving end;

at least two connecting links, each connecting link having a first end and a second end;

the fixed ends being attached to one rail;

the moving ends being pivotally attached to the first ends of the connecting links;

the second ends of the connecting links being attached to at least two rotating fingers.

12. The robotic end-effector of claim 11, wherein said rotating finger rotating mechanisms are linear actuators.

13. The robotic end-effector of claim 7, further comprising:

at least one rail width adjusting mechanism having a fixed end and a working end;

the fixed end being attached to one of said rails; and the working end attached to the other rail.

14. The robotic end-effector of claim 7, further comprising:

at least two pallet hooks, each said pallet hook being pivotally connected to one of each said rails.

15. The robotic end-effector of claim 7, further comprising a suction cup, said suction cup being attached to one of said pallet hooks.

* * * * *